April 30, 1968 T. B. EDWARDS 3,381,200
REGENERATION CIRCUIT WITH SERIES EQUIVALENT MOTOR
Filed Oct. 1, 1965
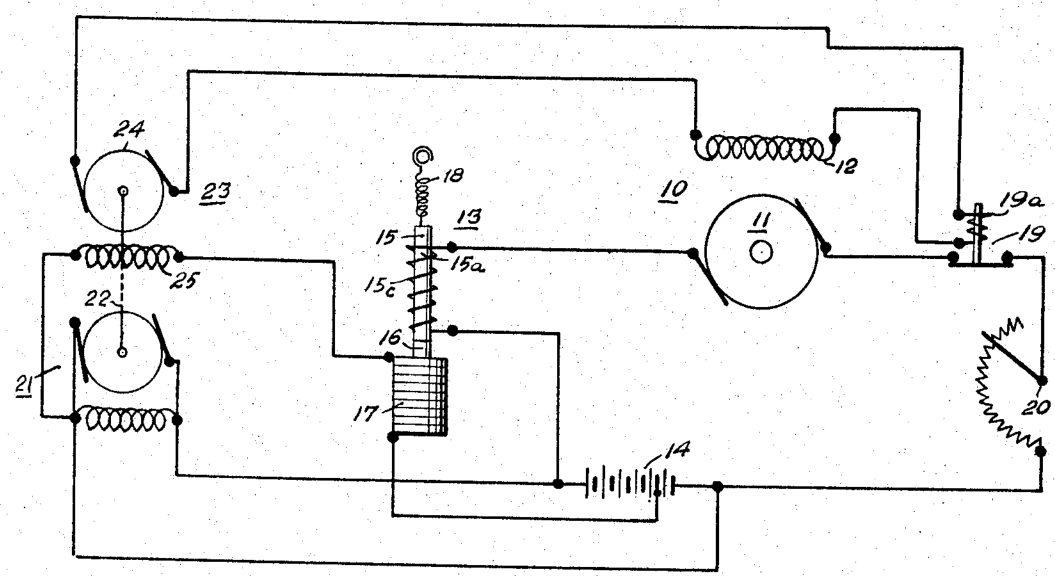
INVENTOR
THEODORIC B. EDWARDS, DECEASED
BY HELEN M. EDWARDS, EXECUTRIX
BY Harry M. Saragovitz, Edward J. Kelly & A. J. Dupont ATTORNEYS United States Patent Office 3,381,200
Patented Apr. 30, 1968

3,381,200

REGENERATION CIRCUIT WITH SERIES EQUIVALENT MOTOR

Theodoric B. Edwards, deceased, late of Lorton, Va., by Helen M. Edwards, executrix, 467 Buckner Road, Manassas, Va. 22110

Filed Oct. 1, 1965, Ser. No. 492,991
1 Claim. (Cl. 318—332)

ABSTRACT OF THE DISCLOSURE

A regenerative circuit wherein high starting torque characteristics of a series motor is maintained and the infinite no load speed eliminated in a D.C. motor for vehicle propulsion by using a motor driven low voltage generator for separately exciting the field winding of the D.C. motor. The field winding of the low voltage generator is connected in series with a carbon pile resistor across a power source. A plunger solenoid connected in series with the armature of the D.C. motor and a power source is aligned with the carbon pile resistor causing the resistance thereof to vary in accordance with the armature current whereby the output of the low voltage generator is controlled with the resultant control of flux density of the separately excited field winding of the D.C. motor.

The invention described herein may be manufactured and used by or for the Government for governmental purposes, without the payment to me of any royalty thereon.

This invention relates to control circuits for D.C. motors used for vehicle propulsion and more particularly to a regeneration circuit including a series equivalent motor for vehicle propulsion.

One difficulty with the D.C. series motor for vehicle propulsion and the like is that if the motor is driven without reversing the field winding connections the motor will not act as a generator due to the demagnetizing of the fields.

An object of the invention is a regeneration circuit including a series equivalent motor for use in vehicle propulsion which produces the high starting torque characteristic of the series motor and eliminates the infinite no load speed.

Another object of the invention is a regeneration circuit including a series equivalent motor and means for controlling the flux density of the field winding of the motor.

Another object of the invention is a motor control circuit for motors utilized in vehicle propulsion wherein the motor functions equally as a generator or motor merely by the effect of the external load on the motor thus permitting regenerative braking.

A still further object of the invention is a simple circuit arrangement for combining the performance characteristics of the series motor with the simple direct regenerative effect of the shunt motor.

The invention will be more fully understood and its objects and advantages further appreciated by referring now to the following detailed specification taken in conjunction with the drawing in which the single figure is a schematic electrical circuit diagram of the invention.

Referring to the drawings, 10 indicates an electric motor for vehicle propulsion consisting of an armature 11 and a separately excited field winding 12. A plunger solenoid 13 has its solenoid 15*c* connected in series with a terminal of armature 11 and one pole of power source 14 which may be a battery or engine driven generator. The plunger 15 is composed of a soft iron rod 15*a* having affixed to one end thereof a nonmagnetic rod 16 in contact with a carbon pile resistor 17. Spring 18 is the plunger bias means. Another terminal of armature 11 is connected through a series circuit, including protective relay 19 which prevents motor operation without field current in winding 12 and motor starter resistor 20, to another pole of power source 14. Shunt motor 21 is also connected to power source 14 and mechanically coupled by means of shaft 22 to the low voltage exciter 23 which consists of an armature 24 and a separately excited field winding 25 which is connected in series with carbon pile resistor 17 and power source 14. The armature 24 through its terminals is in series connection with field winding 12 of motor 10 and winding 19*a* of protective relay 19.

The operation of the circuit is substantially as follows. When the controller, not shown, is closed power source 14 is connected in the circuit and current therefrom flows through a series circuit consisting of motor starter resistor 20, relay 19, armature 11, solenoid 15*c* and power source 14. At the same time shunt motor 21 is energized by power source 14 to drive the low voltage exciter 23 whereby the field winding 12 of motor 10 is energized. The field winding 25 of low voltage exciter 23 is separately energized by the current passing through carbon pile resistor 17, supplied by power source 14, and controlled by the variations in resistance of carbon pile resistor 17 due to the pressure applied thereto by the plunger solenoid 13 in response to the armature current of motor 10. The flux density of field winding 25 of the exciter 23 and hence the voltage applied to field winding 12 of motor 10 depends on the resistance of carbon pile resistor 17. An increase in armature current of motor 10 causes a decrease in the resistance of carbon pile resistor 17 through the action of plunger solenoid 13 resulting in an increase in the current through field winding 25 of exciter 23 which produces an increase in the output voltage of exciter 23 and hence an increase in the flux density of field coil 12 of motor 10. Therefore it can be seen that the flux density of winding 12 is proportional to the armature current of armature 11 and the motor 10 behaves as a series equivalent motor.

Motor 10 will operate equally as a generator or motor merely by the effect of the external load on the motor, thus permitting regenerative braking.

The exciter 23 and carbon pile resistor 17 are proportioned so that the flux density of field winding 12 of motor 10 will not increase much beyond the saturation point nor decrease to zero, resulting in an increase in motor efficiency and elimination of the infinite no load speed characteristic of series motors used in vehicle propulsion.

Although a specific embodiment of the invention has been illustrated and described, it will be understood that this is but illustrative and that various modifications may be made therein without departing from the spirit of the invention and the scope of the appended claim.

What is claimed is:

1. A regeneration circuit with series equivalent motor comprising, a D.C. motor having an armature and separately excited field winding, a motor starter resistor, a power source, an electromagnetic relay provided with a pair of contacts, one terminal of said armature connected to a terminal of said power source through said pair of contacts and motor starter resistor in series connection, a plunger solenoid having a first terminal connected to another terminal of said armature and a second terminal connected to another terminal of said power source, electrical exciter means for exciting said separately excited field winding consisting of a low voltage generator having a field winding and an armature driven by a shunt motor powered by said power source, the armature of said low voltage generator connected in series with said separately excited field winding and the solenoid of said electromagnetic relay, a carbon pile resistor, the field winding of said low voltage generator connected in series with said carbon pile resistor across a part of said power source, said carbon pile resistor positioned in cooperative relationship with said plunger solenoid for controlling the output of said low voltage generator in response to the armature current of said D.C. motor whereby the flux density of said separately excited field winding is controlled.

References Cited

UNITED STATES PATENTS 2,424,310 7/1947 Frisch ------------- 318—332

FOREIGN PATENTS 130,154 11/1932 Austria.
627,806 3/1936 Germany.

ORIS L. RADER, *Primary Examiner.*

J. BAKER, *Assistant Examiner.*